UNITED STATES PATENT OFFICE.

JOSEF ZIEGLER, OF HAMBURG, GERMANY, ASSIGNOR TO FRANZ FRITZSCHE & CO., OF HAMBURG-UHLENHORST, GERMANY.

PROCESS OF MAKING QUINOLIN COMPOUNDS.

SPECIFICATION forming part of Letters Patent No. 563,116, dated June 30, 1896.

Application filed April 17, 1896. Serial No. 588,040. (No specimens.)

*To all whom it may concern:*

Be it known that I, JOSEF ZIEGLER, chemist, a subject of the Emperor of Germany, residing at Hamburg-Uhlenhorst, Germany, have invented new and useful Improvements in Manufacturing an Antiseptic Disinfectant, of which the following is a specification.

My invention has for its object a process for preparing from oxyquinolin a solid antiseptic and disinfecting substance, soluble in water. When it is attempted to prepare an antiseptic from oxyquinolin by means of inorganic acids, for instance, sulfuric acid, the resulting substance is always too acid and too corrosive, as, for instance, the well-known sulfate of oxyquinolin $C_9H_6N.OH.H_2SO_4+2H_2O$, or we get hygroscopic and smearing substances, of which it is impossible to prepare either powder or pastilles. I have found now that out of pyrosulfate of potassium ($K_2S_2O_7$) and oxyquinolin, dissolved in alcohol, it is possible to prepare a disinfecting substance, soluble in water, which substance is remarkable for possessing a consistence which is not too firm, and for the facility with which it can be made into pastilles. The substance has no smell, is neither irritating nor poisonous, but nevertheless has much greater power of killing microbes than carbolic acid.

The process for manufacturing this new antiseptic and disinfecting substance is as follows: I dissolve two molecules of O-oxyquinolin in about five or six times that weight of boiling alcohol, and add gradually, under constant mixing, the proportion of one molecule of pulverized pyrosulfate of potassium, and boil the whole during ten or twelve hours on a reflux-cooler apparatus. When cooled, the contents of the vessel form a tender crystal pulp, which can be easily pumped out, dried, pulverized, and compressed. For instance, twenty-nine kilograms oxyquinolin are dissolved in ten kilograms alcohol, and to this is added gradually, while a mixing arrangement keeps mixing the contents of the boiler, under continual heating, twenty-five kilograms of finely-pulverized pyrosulfate of potassium. After this all the contents of the boiler are boiled on the reflux-cooler apparatus till the end of the process. After ten hours' reaction the transformation is complete. Then follows the cooling, and the product is extracted by removing the alcohol by centrifugal force or by filtration.

The chemical reaction is probably the following:

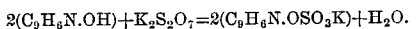

$$2(C_9H_6N.OH)+K_2S_2O_7=2(C_9H_6N.OSO_3K)+H_2O.$$

The product arrived at in this way dissolves in water in any proportion nearly instantaneously, and this watery solution has a remarkable capacity of dissolving phenols, as, for instance, cresol and resorcin, and of giving clear solutions of them, however weak they be.

The present process differs from those formerly in use by pyrosulfate of potassium, instead of sulfuric acid, being brought to act upon oxyquinolin and by the process going on in the presence of alcohol. This new way of treating it gives another product in the end, which, being a crystalline anhydrous powder, can be easily converted into pastilles. Further, the process is simpler, as it consists only of one operation, and there is no necessity for using sulfuric acid.

Having now particularly described and ascertained the nature of my invention and in what manner the same is to be performed, I declare what I claim is—

1. A process of manufacturing an antiseptic disinfectant soluble in water consisting in the treatment of oxyquinolin with pyrosulfate of potassium in alcohol substantially as described.

2. A process of manufacturing an antiseptic disinfectant soluble in water consisting in boiling two molecules O-oxyquinolin in alcohol with one molecule pyrosulfate of potassium separating the product from the alcohol and drying or pressing it, substantially as described.

In testimony whereof I have signed my name to this specification in the presence of two subscribing witnesses.

JOSEF ZIEGLER.

Witnesses:
SOHSFE SUHR,
E. H. MUMMENHOFF.